US009902398B2

(12) United States Patent
Takahashi et al.

(10) Patent No.: US 9,902,398 B2
(45) Date of Patent: Feb. 27, 2018

(54) DRIVING CONTROL DEVICE

(71) Applicant: TOYOTA JIDOSHA KABUSHIKI KAISHA, Toyota-shi, Aichi (JP)

(72) Inventors: Norihiro Takahashi, Sunto-gun (JP); Tomoyuki Kuriyama, Hadano (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 15/017,889

(22) Filed: Feb. 8, 2016

(65) Prior Publication Data

US 2016/0272204 A1 Sep. 22, 2016

(30) Foreign Application Priority Data

Mar. 16, 2015 (JP) ................................ 2015-051619

(51) Int. Cl.
*B60W 30/14* (2006.01)
*B60W 30/16* (2012.01)
(Continued)

(52) U.S. Cl.
CPC ........ *B60W 30/143* (2013.01); *B60W 30/146* (2013.01); *B60W 30/16* (2013.01);
(Continued)

(58) Field of Classification Search
CPC .. B60W 30/143; B60W 30/146; B60W 30/16; B60W 30/162; B60W 30/165;
(Continued)

(56) References Cited

U.S. PATENT DOCUMENTS 5,761,629 A * 6/1998 Gilling .................. B60W 30/16
701/96
6,353,788 B1 * 3/2002 Baker ................... B60W 30/16
701/96
(Continued)

FOREIGN PATENT DOCUMENTS

CN 102610125 A 7/2012
JP 10-252520 A 9/1998
(Continued)

*Primary Examiner* — Dale W Hilgendorf
(74) *Attorney, Agent, or Firm* — Sughrue Mion, PLLC

(57) ABSTRACT

A driving control device that performs overtaking control, includes: a preceding vehicle information acquisition unit configured to acquire preceding vehicle information about a speed of a preceding vehicle; a determination unit configured to determine propriety of the overtaking control, based on a traveling environment; an overtaking vehicle speed calculation unit configured to calculate an overtaking vehicle speed of a host vehicle, based on the preceding vehicle information, in response to a determination by the determination unit that the overtaking control is possible; and a driving control unit configured to execute the overtaking control using the overtaking vehicle speed, wherein the overtaking vehicle speed calculation unit is configured to calculate an overtaking vehicle speed which is faster than a speed of the preceding vehicle and in which a speed difference relative to the speed of the preceding vehicle becomes a predetermined speed difference.

13 Claims, 13 Drawing Sheets

(51) Int. Cl.
*B60W 30/165* (2012.01)
*B60W 30/18* (2012.01)
*B60W 50/14* (2012.01)

(52) U.S. Cl.
CPC ........ *B60W 30/162* (2013.01); *B60W 30/165* (2013.01); *B60W 30/18163* (2013.01); *B60W 50/14* (2013.01); *B60W 2550/00* (2013.01); *B60W 2550/10* (2013.01); *B60W 2550/22* (2013.01); *B60W 2550/30* (2013.01); *B60W 2550/302* (2013.01); *B60W 2720/10* (2013.01)

(58) Field of Classification Search
CPC ....... B60W 30/18163; B60W 2550/30; B60W 2550/22; B60W 2550/302; B60W 2720/10
See application file for complete search history.

(56) References Cited

U.S. PATENT DOCUMENTS

| | | | | |
|---|---|---|---|---|
| 6,842,687 B2* | 1/2005 | Winner | ................ | B60W 30/16 701/96 |
| 2003/0045991 A1* | 3/2003 | Lsogai | ............... | B60K 31/0008 701/96 |
| 2003/0163239 A1 | 8/2003 | Winner et al. | | |
| 2004/0158366 A1 | 8/2004 | Dieterle | | |
| 2008/0027607 A1* | 1/2008 | Ertl | ........................ | B60W 30/16 701/36 |
| 2012/0078484 A1* | 3/2012 | Kato | .................... | B60W 30/16 701/96 |
| 2012/0188374 A1* | 7/2012 | Taner | ............... | B60W 30/18163 348/148 |
| 2013/0173113 A1* | 7/2013 | Takiguchi | ........... | B60W 10/184 701/36 |
| 2014/0176321 A1* | 6/2014 | Chen | .................... | B60W 30/14 340/435 |
| 2015/0266477 A1* | 9/2015 | Schmudderich | ...... | B60W 30/16 701/98 |
| 2015/0353087 A1* | 12/2015 | Niino | ................... | B60W 30/16 701/96 |

FOREIGN PATENT DOCUMENTS

| | | | |
|---|---|---|---|
| JP | 2003-063273 | A | 3/2003 |
| JP | 2004525814 | A | 8/2004 |
| JP | 2005527416 | A | 9/2005 |
| JP | 2007-108967 | A | 4/2007 |
| JP | 2007108967 | A * | 4/2007 |
| JP | 2009-248892 | A | 10/2009 |

* cited by examiner

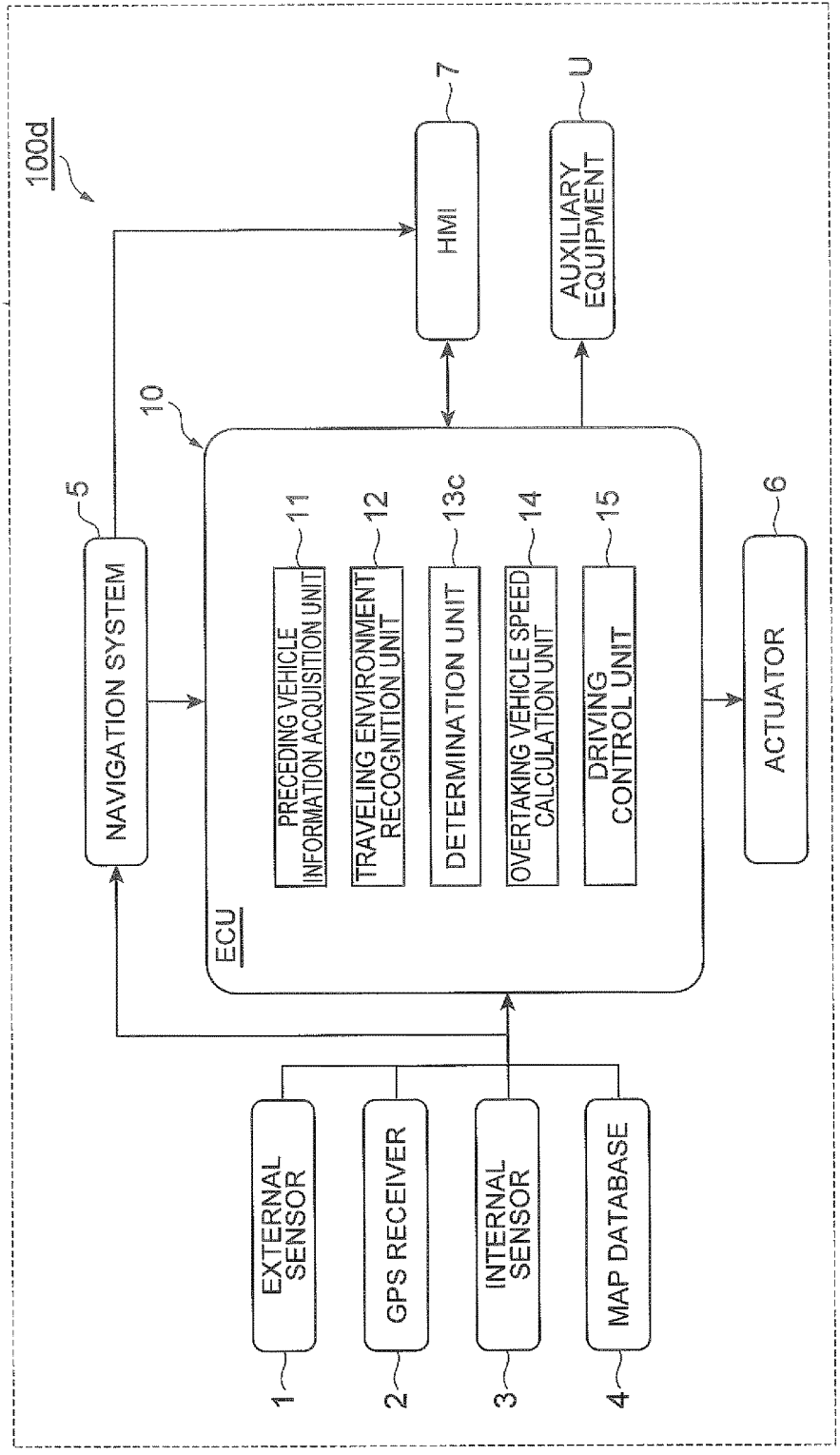

DRIVING CONTROL DEVICE

TECHNICAL FIELD

Various aspects of the present invention relate to a driving control device.

BACKGROUND

In the related art, as described in Japanese Unexamined Patent Application Publication No. 2003-63273, as a driving control device of a vehicle such as an automobile, a driving control device is known which performs driving control such that a host vehicle is driven at a certain setting vehicle speed set by a driver, in a case where a preceding vehicle does not exist in front of the host vehicle, and performs driving control such that the host vehicle is driven while maintaining an inter-vehicle distance between the preceding vehicle and the host vehicle, in a case where a preceding vehicle exists in front of the host vehicle.

In the device of Japanese Unexamined Patent Application Publication No. 2003-63273, in a case where the speed of the host vehicle becomes slower than the setting vehicle speed due to the speed of the preceding vehicle being slower than the setting vehicle speed and an overtaking lane exists, driving control is performed such that the host vehicle overtakes the preceding vehicle.

SUMMARY

Incidentally, in the related art described above, in a case where the host vehicle overtakes the preceding vehicle, the speed of the host vehicle is controlled such that it is the setting vehicle speed. For this reason, in a case where the preceding vehicle travels at a speed slightly slower than the host vehicle which is being driven at the setting vehicle speed, there is a case where a long time is required from the start of the overtaking to the completion of the overtaking. However, there is a case where it is desirable to complete overtaking in a shorter time, and thus improvement is desired.

Therefore, an object of the present invention is to provide a driving control device in which it is possible to complete overtaking in a shorter time according to a speed of a preceding vehicle.

According to an aspect of the present invention, there is provided a driving control device that performs overtaking control for overtaking a preceding vehicle in front of a host vehicle, including: a preceding vehicle information acquisition unit configured to acquire preceding vehicle information about a speed of the preceding vehicle; a traveling environment recognition unit configured to recognize a traveling environment of the host vehicle; a determination unit configured to determine propriety of the overtaking control, based on the traveling environment; an overtaking vehicle speed calculation unit configured to calculate an overtaking vehicle speed of the host vehicle, based on the preceding vehicle information, in response to a determination by the determination unit that the overtaking control is possible; and a driving control unit configured to execute the overtaking control using the overtaking vehicle speed, wherein the overtaking vehicle speed calculation unit is configured to calculate the overtaking vehicle speed which is faster than the speed of the preceding vehicle and in which a speed difference relative to the speed of the preceding vehicle becomes a predetermined speed difference.

According to this configuration, the overtaking vehicle speed of the host vehicle, which is faster than the speed of the preceding vehicle and in which a speed difference relative to the speed of the preceding vehicle becomes a predetermined speed difference, is calculated by the overtaking vehicle speed calculation unit, based on the preceding vehicle information about the speed of the preceding vehicle. For this reason, it becomes possible to complete overtaking in a shorter time according to the speed of the preceding vehicle.

In this case, the determination unit may be configured to recognize a legal maximum speed on a road on which the host vehicle is traveling, based on the traveling environment, and determine propriety of the overtaking control using the overtaking vehicle speed exceeding the maximum speed, in a case where the overtaking vehicle speed in which a speed difference relative to the speed of the preceding vehicle becomes the predetermined speed difference exceeds the maximum speed, and the overtaking vehicle speed calculation unit may be configured to calculate the overtaking vehicle speed exceeding the maximum speed, in response to a determination by the determination unit that the overtaking control using the overtaking vehicle speed exceeding the maximum speed is possible.

According to this configuration, by the determination unit, the legal maximum speed on a road on which the host vehicle is traveling is recognized based on the traveling environment and the propriety of the overtaking control using the overtaking vehicle speed exceeding the maximum speed is determined in a case where the overtaking vehicle speed in which a speed difference relative to the speed of the preceding vehicle becomes the predetermined speed difference exceeds the maximum speed, and in a case where it is determined that the overtaking control using the overtaking vehicle speed exceeding the maximum speed is possible, the overtaking vehicle speed exceeding the maximum speed is calculated by the overtaking vehicle speed calculation unit. For this reason, it becomes possible to complete overtaking in a shorter time according to the traveling environment.

Further, the determination unit may be configured to determine that the overtaking control using the overtaking vehicle speed exceeding the maximum speed is possible, in either of a case where another vehicle which travels on the same lane as a lane on which the host vehicle travels is approaching at a speed higher than or equal to the maximum speed from the rear of the host vehicle and a case where another vehicle which travels on a lane which joins the lane on which the host vehicle travels is approaching the host vehicle from the side or the rear of the host vehicle.

According to this configuration, in a traveling environment in which a long time being required for overtaking is not desirable, as in a case where another vehicle which travels on the same lane as the host vehicle is approaching from the rear at a high speed higher than or equal to the maximum speed, or a case where another vehicle which tries to join the lane on which the host vehicle travels is approaching from the side or the rear, it becomes possible to complete overtaking in a shorter time.

Further, the determination unit may be configured to determine that the overtaking control is possible, in a case where a space in which the host vehicle can travel exists in front of the preceding vehicle.

According to this configuration, in a case where a space in which the host vehicle can travel exists in front of the preceding vehicle, a determination that the overtaking control is possible is made by the determination unit, and therefore, a time in which the host vehicle travels in excess of the legal maximum speed can be prevented from becoming longer due to, for example, the overtaking control using the overtaking vehicle speed exceeding the legal maximum speed being started, though the space in which the host vehicle can travel does not exist in front of the preceding vehicle.

Further, the determination unit may be configured to determine that the overtaking control is possible, in a case where an estimated overtaking time from start of the overtaking control to completion of the overtaking control is less than or equal to an overtaking time threshold value.

According to this configuration, in a case where the estimated overtaking time from the start of the overtaking control to the completion of the overtaking control is less than or equal to the overtaking time threshold value, a determination that the overtaking control is possible is made by the determination unit, and therefore, a time in which the host vehicle travels in excess of the legal maximum speed can be prevented from becoming longer due to, for example, the overtaking control using the overtaking vehicle speed exceeding the legal maximum speed being started, though the overtaking time is long.

Further, the driving control device may further include: a notification unit configured to notify a driver of the host vehicle that the overtaking control is possible, in response to a determination by the determination unit that the overtaking control is possible; and a permission acceptance unit configured to accept permission of the overtaking control from the driver of the host vehicle in response to a notification by the notification unit that the overtaking control is possible, wherein the driving control unit may be configured to control driving of the host vehicle such that the preceding vehicle is not overtaken, in a case where the permission acceptance unit does not accept permission of the overtaking control from the driver of the host vehicle.

According to this configuration, in a case where a determination that the overtaking control is possible having been made by the determination unit is notified to the driver by the notification unit and the permission acceptance unit does not accept permission of the overtaking control from the driver, the driving of the host vehicle is controlled by the driving control unit such that the preceding vehicle is not overtaken. For this reason, for example, the overtaking control using the overtaking vehicle speed exceeding the legal maximum speed can be prevented from being performed, even though this is not intended by the driver.

According to the present invention, it becomes possible to complete overtaking in a shorter time according to a speed of a preceding vehicle.

BRIEF DESCRIPTION OF THE DRAWINGS

FIG. 11 is a block diagram showing the configuration of a driving control device according to a fourth embodiment.

DETAILED DESCRIPTION

Hereinafter, embodiments of the present invention will be described in detail using the drawings.

First Embodiment

Figure 1:
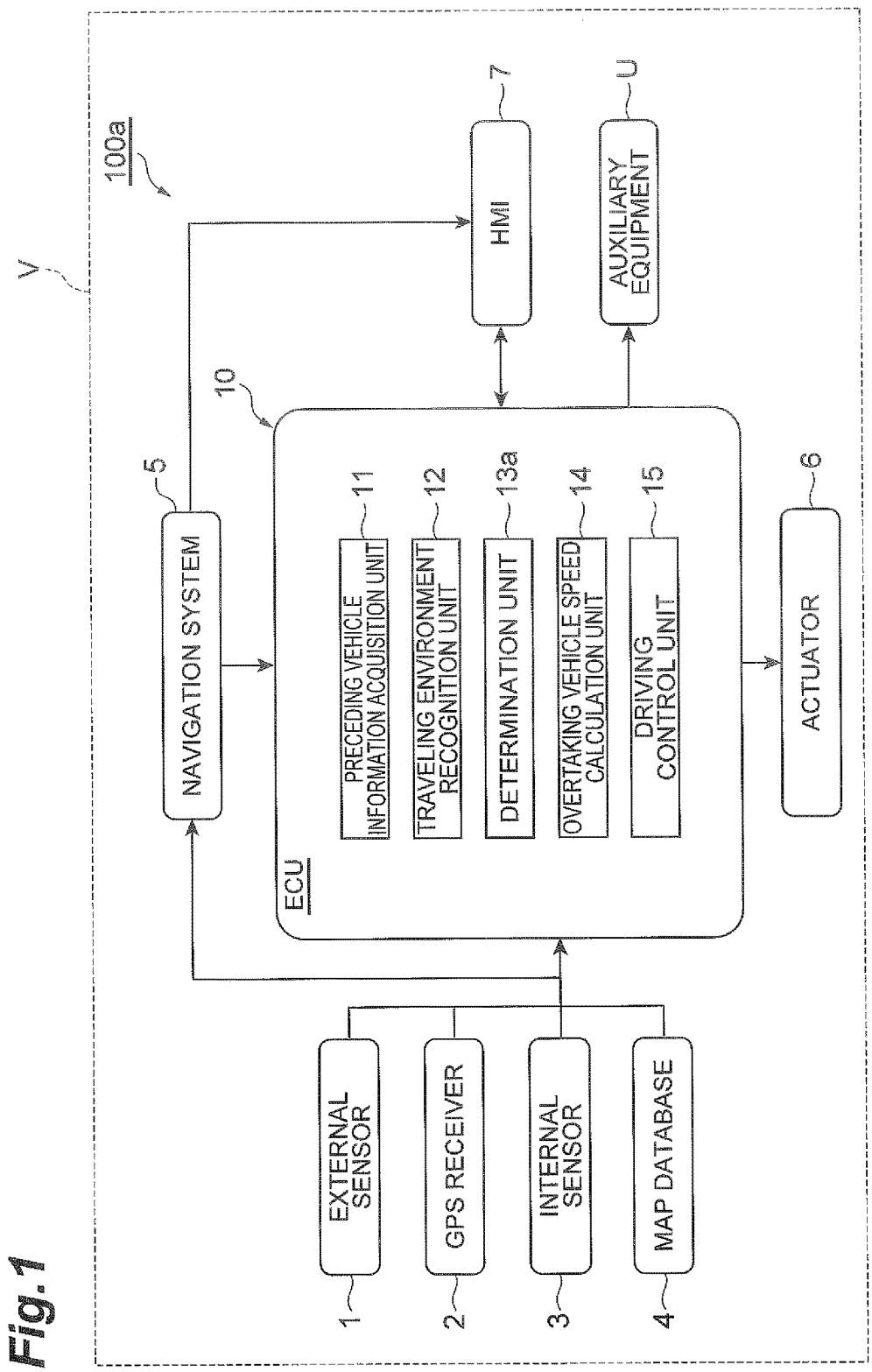
FIG. 1 is a block diagram showing the configuration of a driving control device according to a first embodiment.

As shown in FIG. 1, a driving control device 100a according to a first embodiment is mounted on a host vehicle V such as a passenger car. The driving control device 100a performs driving control such that the host vehicle V travels at a setting vehicle speed set by a driver, in a case where a preceding vehicle does not exist in front of the host vehicle V. On the other hand, the driving control device 100a performs overtaking control in a case where it is determined that overtaking control for overtaking a preceding vehicle in front of the host vehicle V is possible, based on a traveling environment of the host vehicle, in a case where a preceding vehicle exists in front of the host vehicle V. The overtaking control means, for example, driving control in which driving operations such as acceleration, deceleration, and steering of the host vehicle V, which are necessary to overtake a preceding vehicle in front of the host vehicle V, are executed regardless of a driving operation of a driver of the host vehicle V.

As shown in FIG. 1, the driving control device 100a is provided with an external sensor 1, a GPS (Global Positioning System) receiver 2, an internal sensor 3, a map database 4, a navigation system 5, an actuator 6, an HMI (Human Machine Interface) 7, auxiliary equipment U, and an ECU 10.

The external sensor 1 is detection equipment which detects an external situation that is information on the surroundings of the host vehicle V. The external sensor 1 includes at least one of a camera, a radar, and a LIDAR (Laser Imaging Detection and Ranging).

The camera is imaging equipment which images an external situation of the host vehicle V. The camera is provided on, for example, the vehicle interior side of a front windshield of the host vehicle V. The camera may be a monocular camera or may be a stereo camera. A stereo camera has two imaging units disposed so as to reproduce, for example, a binocular parallax. Information in a depth direction is also included in the imaging information of the stereo camera. The camera outputs imaging information about the external situation of the host vehicle V to the ECU 10. Further, the camera may be not only a visible light camera, but also an infrared camera.

The radar detects an object outside of the host vehicle V by using radio waves. The radio waves are, for example, millimeter waves. The radar transmits radio waves to the surroundings of the host vehicle V and receives the radio waves reflected by an object, thereby detecting the object. The radar can output, for example, a distance or a direction to the object as object information about the object. The radar outputs the detected object information to the ECU 10. In addition, in a case of performing sensor fusion in a subsequent stage, the radar may output receiving information of the reflected radio waves to the ECU 10.

The LIDAR detects an object outside of the host vehicle V by using light. The LIDAR sends light to the surroundings of the host vehicle V and receives the light reflected by an object, thereby measuring a distance to a reflection point and detecting the object. The LIDAR can output, for example, a distance or a direction to the object as object information. The LIDAR outputs the detected object information to the ECU 10. In addition, in a case of performing sensor fusion in a subsequent stage, the LIDAR may output receiving information of the reflected light to the ECU 10. In addition, the camera, the radar, and the LIDAR need not necessarily be provided overlappingly.

The GPS receiver 2 receives signals from three or more GPS satellites, thereby acquiring position information indicating the position of the host vehicle V. For example, a latitude and longitude are included in the position information. The GPS receiver 2 outputs information on the measured position of the host vehicle V to the ECU 10. In addition, instead of the GPS receiver 2, other means capable of identifying the latitude and longitude at which the host vehicle V is present may be used.

The internal sensor 3 is a detector which detects information corresponding to a traveling state of the host vehicle V. The internal sensor 3 includes a vehicle speed sensor in order to detect information corresponding to the traveling state of the host vehicle V. Further, the internal sensor 3 may include either of an acceleration sensor and a yaw rate sensor.

The vehicle speed sensor is a detector which detects the speed of the host vehicle V. As the vehicle speed sensor, for example, a wheel speed sensor which is provided at a wheel of the host vehicle V or a drive shaft or the like which rotates integrally with the wheels, and detects the rotational speed of the wheels, may be used. The vehicle speed sensor outputs vehicle speed information (wheel speed information) which includes the speed of the host vehicle V to the ECU 10.

The acceleration sensor is a detector which detects the acceleration of the host vehicle V. The acceleration sensor includes, for example, a forward and backward acceleration sensor which detects the acceleration in a front-back direction of the host vehicle V, and a lateral acceleration sensor which detects the lateral acceleration of the host vehicle V. The acceleration sensor outputs acceleration information which includes the acceleration of the host vehicle V to the ECU 10.

The yaw rate sensor is a detector which detects a yaw rate (rotational angular velocity) around a vertical axis of the center of gravity of the host vehicle V. As the yaw rate sensor, for example, a gyro sensor can be used. The yaw rate sensor outputs yaw rate information which includes the yaw rate of the host vehicle V to the ECU 10.

The map database 4 is a database provided with map information. The map database 4 is stored in, for example, a ID (Hard disk drive) mounted on the host vehicle V. For example, position information of a road, information about a road shape, and position information of an intersection and a branch point are included in the map information. For example, the types of a curve and a straight portion, the curvature of a curve, and the like are included in the information about a road shape. Further, in a case where the driving control device 100a uses position information of a shielding structure such as a building or a wall, or a SLAM (Simultaneous Localization and Mapping) technique, an output signal of the external sensor 1 may be included in the map information. In addition, the map database 4 may be stored in a computer of a facility such as an information processing center capable of communicating with the host vehicle V.

The navigation system 5 is a device which performs guidance to a destination set on a map by the driver of the host vehicle V for the driver of the host vehicle V. The navigation system 5 calculates a route on which the host vehicle V travels, based on the position information of the host vehicle V measured by the GPS receiver 2 and the map information of the map database 4. The route may be, for example, a route in which a driving lane on which the host vehicle V travels is specified in sections of a plurality of lanes. The navigation system 5 calculates, for example, a target route from the position of the host vehicle V to a destination and performs the notification of the target route to a driver by display of a display and an audio output of a speaker. The navigation system 5 outputs, for example, information about the target route of the host vehicle V to the ECU 10. In addition, the navigation system 5 may use information stored in a computer of a facility such as an information processing center capable of communicating with the host vehicle V. Alternatively, some of processing which is performed by the navigation system 5 may be performed by the computer of the facility.

The actuator 6 is a device which executes the driving control of the host vehicle V. The actuator 6 includes at least a throttle actuator, a brake actuator, and a steering actuator. The throttle actuator controls the intake amount of air to an engine (the degree of throttle opening) according to a control signal from the ECU 10, thereby controlling the drive force of the host vehicle V. In addition, in a case where the host vehicle V is a hybrid car or an electric automobile, the throttle actuator is not included, and a control signal from the ECU 10 is input to a motor as a power source, whereby the drive force is controlled.

The brake actuator controls a brake system according to a control signal from the ECU 10, thereby controlling a braking force which is applied to the wheels of the host vehicle V. As the brake system, for example, a hydraulic brake system can be used. The steering actuator controls the driving of an assist motor which controls a steering torque of an electric power steering system, according to a control signal from the ECU 10. In this way, the steering actuator controls the steering torque of the host vehicle V.

The HMI 7 is an interface for performing the output and the input of information between an occupant (including a driver) of the host vehicle V and the driving control device 100a. The HMI 7 is provided with, for example, a display panel for displaying image information to the occupant, a speaker for an audio output, operation buttons or a touch panel for allowing the occupant to perform an input operation, and the like. The HMI 7 may be provided with a microphone for allowing the occupant to perform voice input. The HMI 7 may perform the output of information to the occupant by using a portable information terminal wirelessly connected thereto and may accept an operation input by the occupant by using the portable information terminal.

The auxiliary equipment U is equipment which normally can be operated by the driver of the host vehicle V. The auxiliary equipment U is a general term for equipment which is not included in the actuator 6. The auxiliary equipment U here includes, for example, direction indicator lamps, headlights, a wiper, and the like.

The ECU 10 performs the driving control of the host vehicle V. The ECU 10 is an electronic control unit having a CPU (Central Processing Unit), a ROM (Read Only Memory), a RAM (Random Access Memory), and the like. The ECU 10 has a preceding vehicle information acquisition unit 11, a traveling environment recognition unit 12, a determination unit 13a, an overtaking vehicle speed calculation unit 14, and a driving control unit 15. In the ECU 10, the control of each unit such as the preceding vehicle information acquisition unit 11 described above is executed by loading a program stored in the ROM into the RAM and executing the program in the CPU. The ECU 10 may be composed of a plurality of electronic control units.

The preceding vehicle information acquisition unit 11 acquires preceding vehicle information about the speed of a preceding vehicle, based on information output from the external sensor 1. In addition to another vehicle which travels on a lane on which the host vehicle V travels, still another vehicle which is being driven on a lane on which the host vehicle V is not being driven, on a road on which the host vehicle V is traveling, is also included as a preceding vehicle. Information such as the position of the preceding vehicle, the relative speed of the preceding vehicle relative to the host vehicle V, and a traveling direction of the preceding vehicle may be included in the preceding vehicle information. Further, there is no limitation to a single number of preceding vehicles, and with respect to a plurality of preceding vehicles, the preceding vehicle information as described above may be acquired by the preceding vehicle information acquisition unit 11.

The traveling environment recognition unit 12 recognizes a traveling environment of the host vehicle V. For example, the legal maximum speed on the road on which the host vehicle V is traveling, the position in the entire road, of the lane on which the host vehicle V travels, the presence or absence of a lane contiguous to the lane on which the host vehicle V travels, the number of lanes of the road on which the host vehicle V is traveling, the presence or absence of a lane which joins the lane on which the host vehicle V travels, a situation which the preceding vehicle information acquired by the preceding vehicle information acquisition unit 11 indicates, and a situation of another vehicle which is being driven at the side or the rear of the host vehicle V, other than the preceding vehicle, are included in the traveling environment. In the situation of another vehicle which is being driven at the side or the rear of the host vehicle V, other than the preceding vehicle, information such as the speed of the other vehicle, the position of the other vehicle, and the relative speed of the other vehicle relative to the host vehicle V, and a traveling direction of another vehicle is included. The traveling environment recognition unit 12 recognizes the traveling environment of the host vehicle V from information output from the external sensor 1, the GPS receiver 2, the internal sensor 3, the map database 4, and the navigation system 5.

The determination unit 13a determines the propriety of overtaking control, based on the traveling environment of the host vehicle V. Further, the determination unit 13a recognizes the legal maximum speed on the road on which the host vehicle V is traveling, based on the traveling environment of the host vehicle V, and, in a case where an overtaking vehicle speed in which a speed difference relative to the speed of the preceding vehicle becomes a predetermined speed difference exceeds the legal maximum speed, determines the propriety of the overtaking control using the overtaking vehicle speed exceeding the legal maximum speed.

The overtaking vehicle speed calculation unit 14 calculates the overtaking vehicle speed of the host vehicle V, based on the preceding vehicle information acquired by the preceding vehicle information acquisition unit 11, in response to a determination by the determination unit 13a that the overtaking control is possible. The overtaking vehicle speed calculation unit 14 calculates, in principle, an overtaking vehicle speed which is faster than the speed of the preceding vehicle and in which a speed difference relative to the speed of the preceding vehicle becomes a predetermined speed difference. The overtaking vehicle speed means, for example, a target speed of the host vehicle V which is being subjected to the overtaking control. The driving control unit 15 executes the overtaking control using the overtaking vehicle speed calculated by the overtaking vehicle speed calculation unit 14. Further, the driving control unit 15 may perform following driving control such that the host vehicle V does not overtake the preceding vehicle but performs following traveling while maintaining an inter-vehicle distance set for a preceding vehicle in advance. The following driving control means, for example, control in which driving operations such as acceleration, deceleration, and steering of the host vehicle V, which are necessary to perform following traveling while maintaining the inter-vehicle distance set for a preceding vehicle in advance, are executed regardless of a driving operation of the driver of the host vehicle V.

Figure 2:
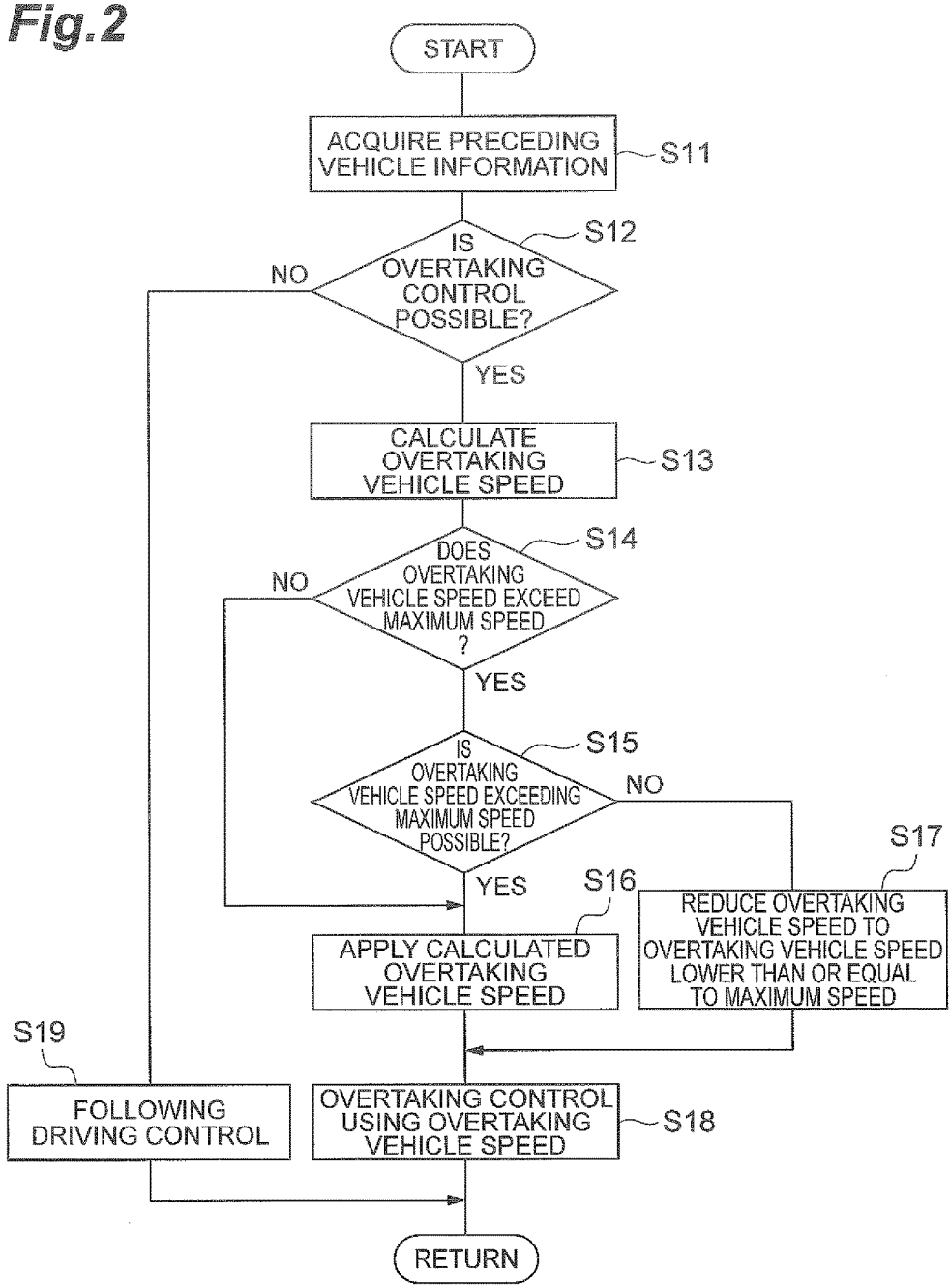
FIG. 2 is a flowchart showing an operation of the driving control device of FIG. 1.

Next, processing which is executed in the driving control device 100a will be described. As shown in FIG. 2, the preceding vehicle information acquisition unit 11 of the ECU 10 acquires preceding vehicle information about the speed of a preceding vehicle (S11) The determination unit 13a of the ECU 10 determines the propriety of the overtaking control, based on the traveling environment of the host vehicle V (S12).

Figure 3A:
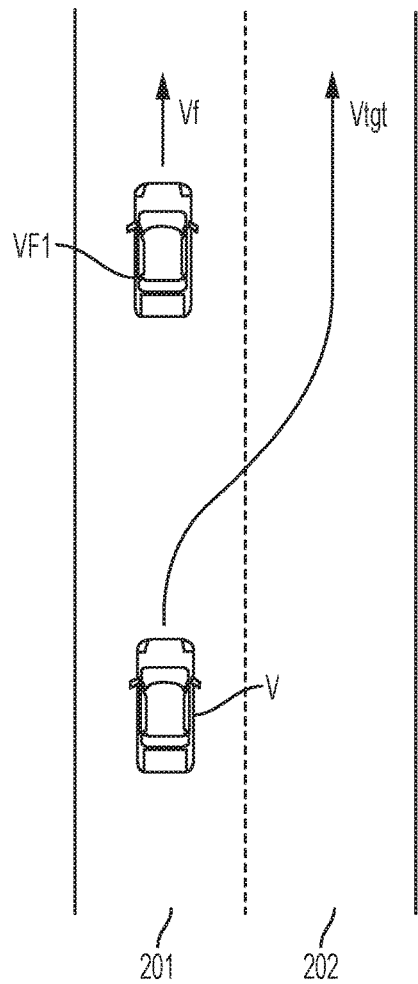
FIG. 3A is a plan view showing a situation where a host vehicle overtakes a preceding vehicle while performing a lane change.

For example, control to make an operation in which the host vehicle V overtakes a preceding vehicle VF1 which travels on a lane 201 on which the host vehicle V travels, while performing a lane change from the lane 201 on which the host vehicle V travels to a lane 202 contiguous to the lane 201, as shown in FIG. 3A, be performed on the host vehicle V, is included in the above-described overtaking control. Further, for example, control to make an operation in which the host vehicle V overtakes the preceding vehicle VF1 which travels on the lane 201 contiguous to the lane 202 on which the host vehicle V travels, while traveling on the lane 202 on which the host vehicle V is currently traveling, as shown in FIG. 3B, be performed on the host vehicle V, is included in the above-described overtaking control.

Figure 3B:
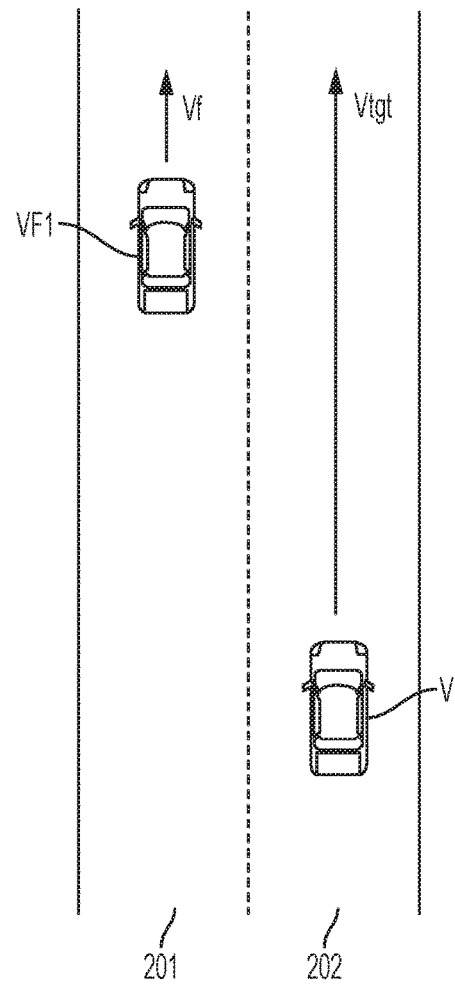
FIG. 3B is a plan view showing a situation where a host vehicle overtakes a preceding vehicle while traveling on the same lane.

In any overtaking control of FIGS. 3A and 3B, control to make an operation in which after the host vehicle V overtakes the preceding vehicle VF1, the host vehicle V performs a lane change to the lane 201 on which the preceding vehicle VF1 travels, be performed on the host vehicle V, is also included in the overtaking control. In any the overtaking control of FIGS. 3A and 3B, with respect to a speed $V_f$ of the preceding vehicle VF1, the speed of the host vehicle V is controlled such that it is an overtaking vehicle speed $V_{tgt}$.

In this embodiment, in any case of FIGS. 3A and 3B, in a case where there is the lane 201 or the lane 202 on which the preceding vehicle VF1 exists and another vehicle does not exist, the determination unit 13a determines that the overtaking control is possible. In this case, the determination unit 13a may set whether or not the host vehicle V can be accelerated at the overtaking vehicle speed $V_{tgt}$ faster than the speed $V_f$ of the preceding vehicle VF1 in the acceleration performance of the host vehicle V, as a condition of whether or not the overtaking control is possible.

In a case where the determination unit 13a determines that the overtaking control is possible (S12), the overtaking vehicle speed calculation unit 14 calculates the overtaking vehicle speed $V_{tgt}$ of the host vehicle, based on the preceding vehicle information such as the speed $V_f$ of the preceding vehicle VF1 (S13). The overtaking vehicle speed calculation unit 14 calculates the overtaking vehicle speed $V_{tgt}$ which is faster than the speed $V_f$ of the preceding vehicle VF1 or the like and in which a speed difference relative to the speed $V_f$ of the preceding vehicle VF1 becomes a predetermined speed difference. The overtaking vehicle speed calculation unit 14 can calculate the overtaking vehicle speed $V_{tgt}$ such that it becomes equal to the value of speed $V_f \times A$, for example. Here, A is an arbitrary coefficient such as 1 or 2 with respect to the speed $V_f$. Further, the overtaking vehicle speed calculation unit 14 can calculate the overtaking vehicle speed $V_{tgt}$ such that it becomes equal to the value of speed $V_f + B$, for example. Here, B is an arbitrary speed difference such as 20 [km/h] relative to the speed $V_f$.

The determination unit 13a recognizes the legal maximum speed on the road on which the host vehicle V is traveling, based on the traveling environment, and, in a case where the overtaking vehicle speed $V_{tgt}$ in which a speed difference relative to the speed $V_f$ of the preceding vehicle VF1 becomes a predetermined speed difference exceeds the maximum speed (S14), determines the propriety of the overtaking control using the overtaking vehicle speed $V_{tgt}$ exceeding the maximum speed (S15). Hereinafter, an example of determining the propriety of the overtaking control using the overtaking vehicle speed $V_{tgt}$ exceeding the legal maximum speed on the road on which the host vehicle V is traveling will be described.

Figure 4A:
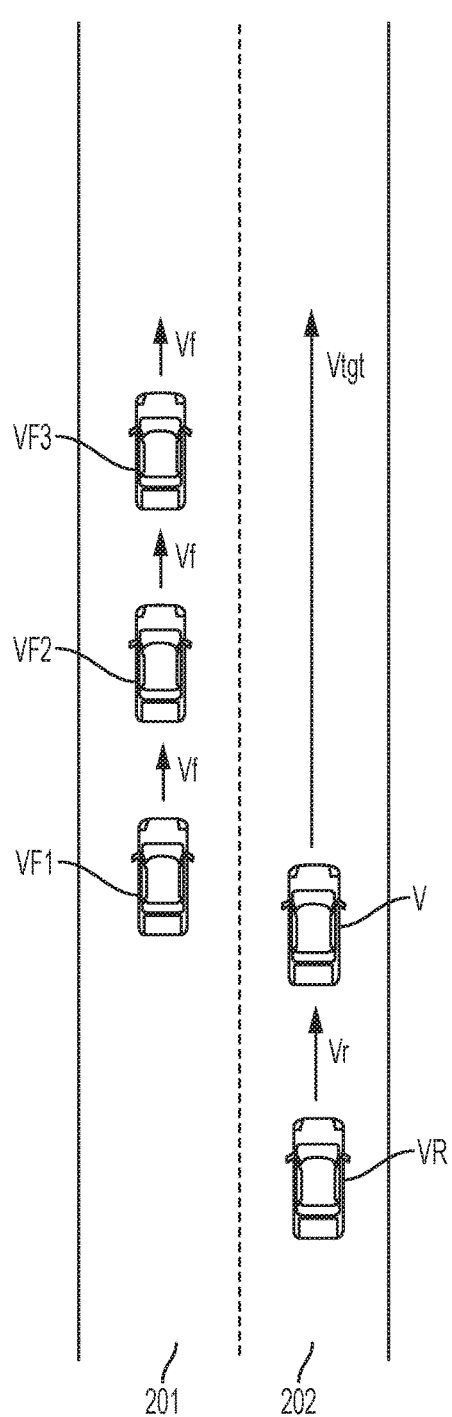
FIG. 4A is a plan view showing a situation where another vehicle which travels on the same lane as a lane on which a host vehicle travels is approaching at a faster speed than the legal maximum speed from the rear of the host vehicle.
Figure 4B:
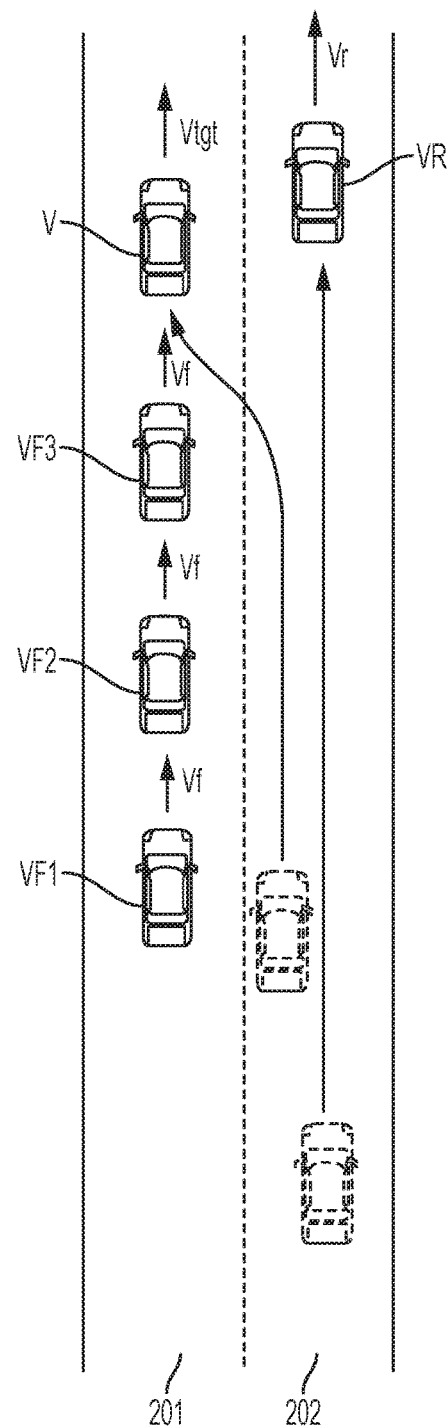
FIG. 4B is a plan view showing a situation where in the situation of FIG. 4A, the host vehicle has overtaken a preceding vehicle at an overtaking vehicle speed exceeding the legal maximum speed.

For example, as shown in FIG. 4A, a situation where the host vehicle V is traveling on the lane 202 and preceding vehicles VF1, VF2, and VF3 are traveling on the lane 201 contiguous to the lane 202 is assumed. In this situation, a following vehicle VR which is another vehicle which travels on the same lane 202 as the lane 202 on which the host vehicle V travels is approaching from the rear of the host vehicle V at a speed V, higher than or equal to the legal maximum speed. As shown in FIG. 4B, in a case where after the host vehicle V overtakes the preceding vehicles VF1, VF2, and VF3 at the overtaking vehicle speed $V_{tgt}$ lower than or equal to the legal maximum speed, and the host vehicle V does not perform a lane change to the lane 201 on which the preceding vehicles VF1, VF2, and VF3 travel, there is a possibility that the host vehicle V may impede the traveling of the following vehicle VR. In this case, since it is a traveling environment in which a long time being required for overtaking is not desirable, the determination unit 13a determines that the overtaking control using the overtaking vehicle speed $V_{tgt}$ exceeding the legal maximum speed on the road on which the host vehicle V is traveling is possible.

Figure 5A:
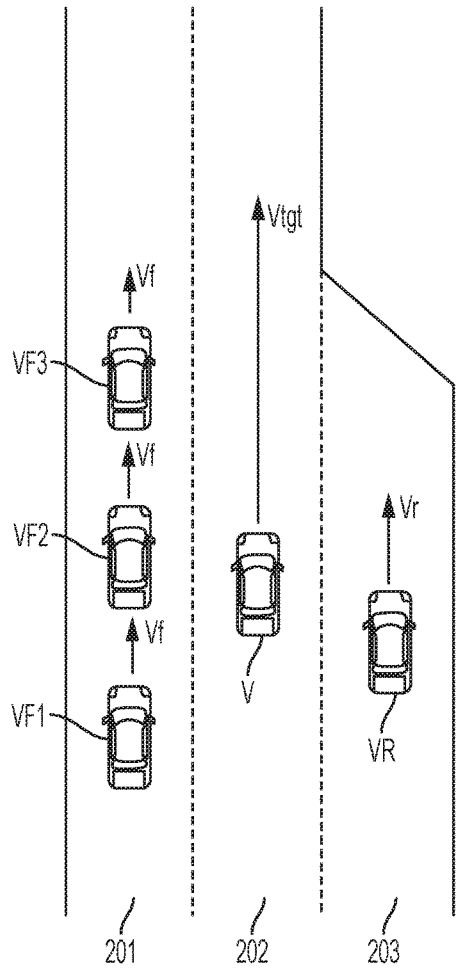
FIG. 5A is a plan view showing a situation where another vehicle which travels on a lane that joins a lane on which a host vehicle travels is approaching the host vehicle from the side or the rear of the host vehicle.
Figure 5B:
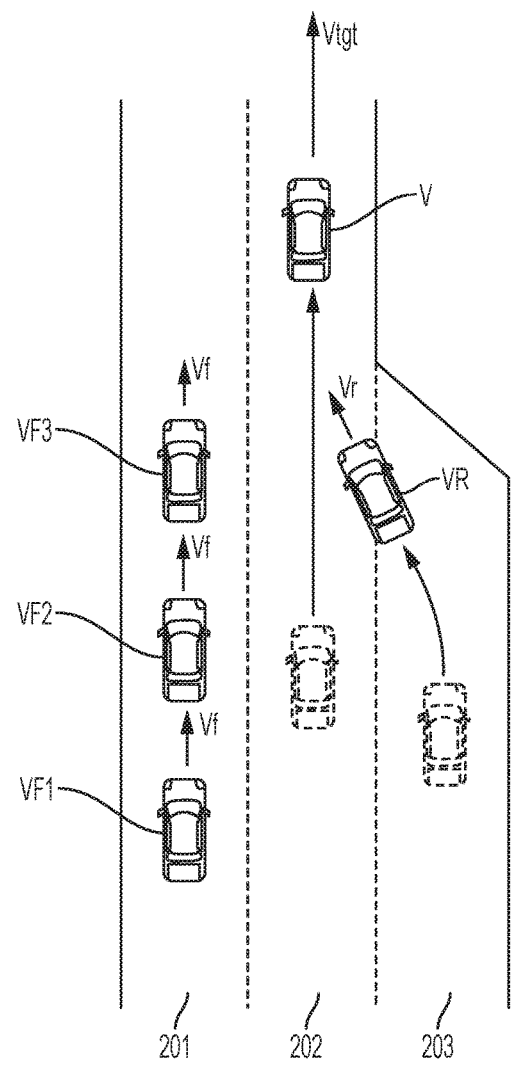
FIG. 5B is a plan view showing a situation where in the situation of FIG. 5A, the host vehicle has overtaken a preceding vehicle at an overtaking vehicle speed exceeding the legal maximum speed.

Further, for example, as shown in FIG. 5A, a situation where the host vehicle V is traveling on the lane 202 and the preceding vehicles VF1, VF2, and VF3 are traveling on the lane 201 contiguous to the lane 202 is assumed. In this situation, the following vehicle VR which is another vehicle which travels on a lane 203 which joins the lane 202 on which the host vehicle V travels is approaching the host vehicle V from the side or the rear of the host vehicle V. As shown in FIG. 5B, in a case where the host vehicle V does not overtake the preceding vehicles VF1, VF2, and VF3 at the overtaking vehicle speed $V_{tgt}$ exceeding the legal maximum speed, there is any one of a possibility that the following vehicle VR may not be able to join the lane 202 and may have to stop or rapidly decelerate in the lane 203, a possibility that the following vehicle VR having stopped or rapidly decelerated on the lane 203 may impede the traveling of another vehicle which follows the following vehicle VR, and a possibility that the following vehicle VR having joined the lane 202 may impede the traveling of the host vehicle V. In this case, since it is a traveling environment in which a long time being required for overtaking is not desirable, the determination unit 13a determines that the overtaking control using the overtaking vehicle speed $V_{tgt}$ exceeding the legal maximum speed on the road on which the host vehicle V is traveling is possible.

In addition to the above cases, the determination unit 13a may determine that the overtaking control using the overtaking vehicle speed $V_{tgt}$ exceeding the legal maximum speed on the road on which the host vehicle V is traveling is possible, for example, in a case where the host vehicle V is an emergency automobile which is not limited to the legal maximum speed, or a case at the time of an emergency such as relief of an emergency case. Alternatively, the determination unit 13a may determine that the overtaking control using the overtaking vehicle speed $V_{tgt}$ exceeding the legal maximum speed on the road on which the host vehicle V is traveling is possible, in a case where an instruction is input from the driver of the host vehicle V through the HMI 7. Further, in a case where a determination that the overtaking control using the overtaking vehicle speed $V_{tgt}$ exceeding the legal maximum speed is not possible is made by the determination unit 13a, when the legal maximum speed is lower than or equal to the speed $V_f$ of the preceding vehicle VF1 or the like, the determination unit 13a may make a determination that the overtaking control is not possible.

As shown in FIG. 2, in response to a determination by the determination unit 13a that the overtaking control using the overtaking vehicle speed $V_{tgt}$ exceeding the legal maximum speed on the road on which the host vehicle V is traveling is possible (S15), the overtaking vehicle speed calculation unit 14 of the ECU 10 applies the overtaking vehicle speed $V_{tgt}$ exceeding the legal maximum speed calculated in S13 (S16). On the other hand, in response to a determination by the determination unit 13a that the overtaking control using the overtaking vehicle speed $V_{tgt}$ exceeding the legal maximum speed on the road on which the host vehicle V is traveling is not possible (S15), the overtaking vehicle speed calculation unit 14 of the ECU 10 reduces the overtaking vehicle speed $V_{tgt}$ exceeding the legal maximum speed calculated in S13 to the overtaking vehicle speed $V_{tgt}$ lower than or equal to the legal maximum speed (S17). In this case, the overtaking vehicle speed calculation unit 14 can change, for example, the overtaking vehicle speed $V_{tgt}$ exceeding the legal maximum speed calculated in S13 to the legal maximum speed. Further, in a case where the overtaking vehicle speed $V_{tgt}$ calculated in S13 does not exceed the legal maximum speed (S14), the overtaking vehicle speed calculation unit 14 applies the overtaking vehicle speed $V_{tgt}$ exceeding the legal maximum speed calculated in S13 (S16).

The driving control unit 15 of the ECU 10 outputs a control signal to the actuator 6, thereby performing the overtaking control using the overtaking vehicle speed $V_{tgt}$ calculated by the overtaking vehicle speed calculation unit 14 (S18), as shown in FIGS. 3A, 3B, 4A, 4B, 5A, and 5B.

Further, in a case where in S12, the determination unit 13a determines that the overtaking control is not possible, the driving control unit 15 outputs a control signal to the actuator 6, thereby performing the following driving control such that the host vehicle V does not overtake the preceding vehicle VF1 or the like but performs following traveling while maintaining the inter-vehicle distance set for the preceding vehicle VF1 or the like in advance (S19).

According to this embodiment, the overtaking vehicle speed $V_{tgt}$ of the host vehicle V, which is faster than the speed $V_f$ of the preceding vehicle VF1 or the like and in which a speed difference relative to the speed of the preceding vehicle VF1 or the like becomes a predetermined speed difference, is calculated based on the preceding vehicle information about the speed of the preceding vehicle VF1 or the like by the overtaking vehicle speed calculation unit 14. For this reason, it becomes possible to complete overtaking in a shorter time according to the speed of the preceding vehicle VF1 or the like.

Further, according to this embodiment, in a case where the legal maximum speed on the road on which the host vehicle V is traveling is recognized based on the traveling environment and the overtaking vehicle speed $V_{tgt}$ in which a speed difference relative to the speed $V_f$ of the preceding vehicle VF1 becomes a predetermined speed difference exceeds the legal maximum speed, the propriety of the overtaking control using the overtaking vehicle speed $V_{tgt}$ exceeding the maximum speed is determined by the determination unit 13a of the driving control device 100a, and in a case where it is determined that the overtaking control using the overtaking vehicle speed $V_{tgt}$ exceeding the maximum speed is possible, the overtaking vehicle speed $V_{tgt}$ exceeding the legal maximum speed is calculated by the overtaking vehicle speed calculation unit 14. For this reason, it becomes possible to complete overtaking in a shorter time according to the traveling environment.

Further, according to this embodiment, in a traveling environment in which a long time being required for overtaking is not desirable, as in a case where the following vehicle VR which travels on the same lane 202 as the host vehicle V is approaching from the rear at a high speed higher than or equal to the legal maximum speed, or a case where the following vehicle VR which tries to join the lane 202 on which the host vehicle V is being driven is approaching from the side or the rear, it becomes possible to complete overtaking in a shorter time.

Second Embodiment

Figure 6:
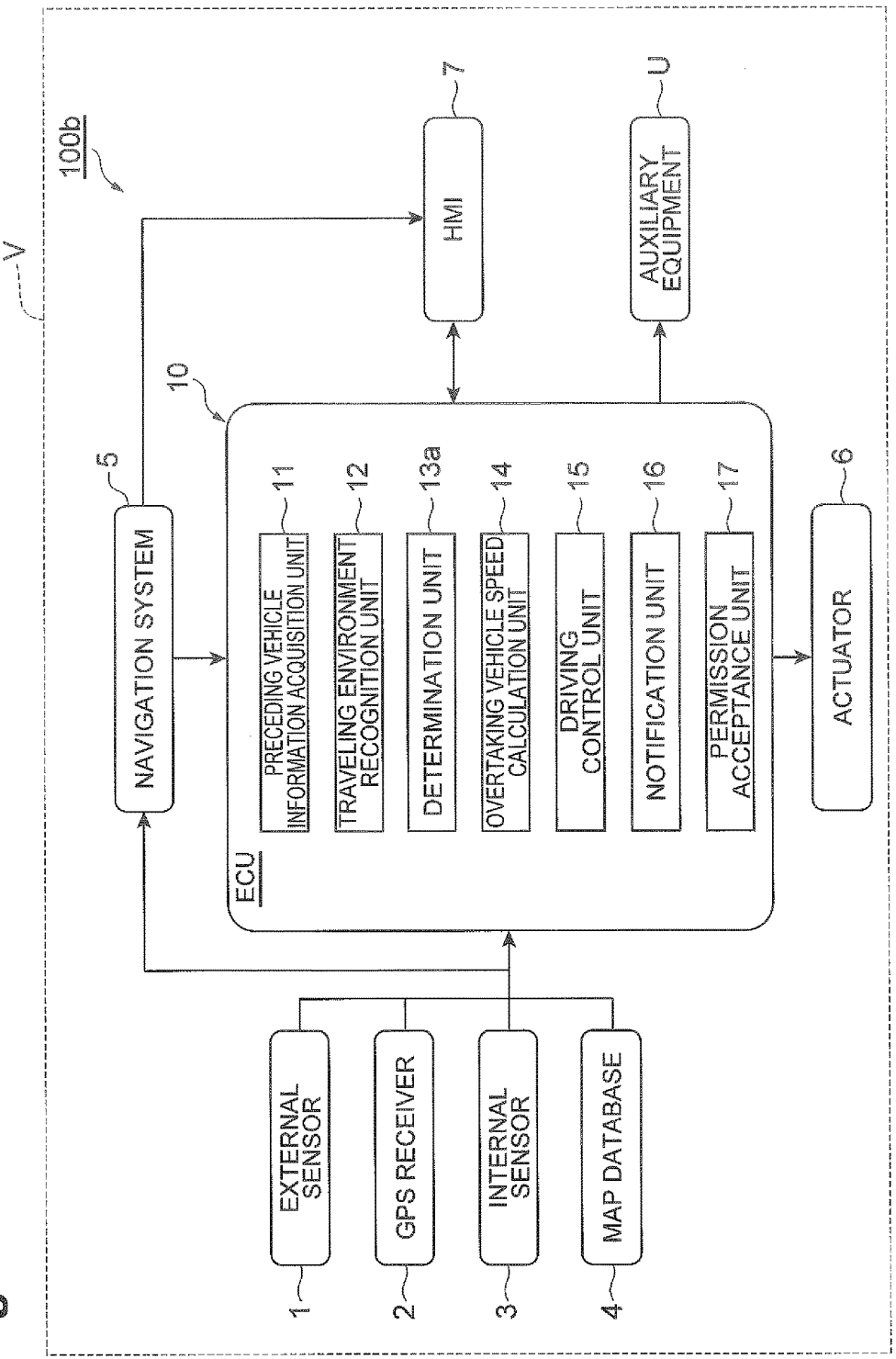
FIG. 6 is a block diagram showing the configuration of a driving control device according to a second embodiment.

Hereinafter, a second embodiment will be described. In this embodiment, in a case where it is determined that the overtaking control is possible, the overtaking control being possible is notified to the driver of the host vehicle V. As shown in FIG. 6, a driving control device 100b according to the second embodiment has a notification unit 16 and a permission acceptance unit 17 in the ECU 10, in addition to the configuration of the driving control device 100a of the first embodiment. The notification unit 16 notifies the driver of the host vehicle V that the overtaking control is possible, in response to a determination by the determination unit 13a that the overtaking control is possible. The notification of the overtaking control being possible is performed by, for example, image information displayed on the display panel of the HMI 7, an audio output from the speaker of the HMI 7, or the like.

The permission acceptance unit 17 accepts the permission of the overtaking control from the driver of the host vehicle V in response to a notification by the notification unit 16 that the overtaking control is possible. The permission of the overtaking control from the driver of the host vehicle V can be accepted by, for example, an input operation by the driver of the host vehicle V to the operation buttons, the touch panel, or the like of the HMI 7. Further, the permission of the overtaking control from the driver of the host vehicle V may be accepted by, for example, a voice input by the driver of the host vehicle V to the microphone of the HMI 7.

Figure 7:
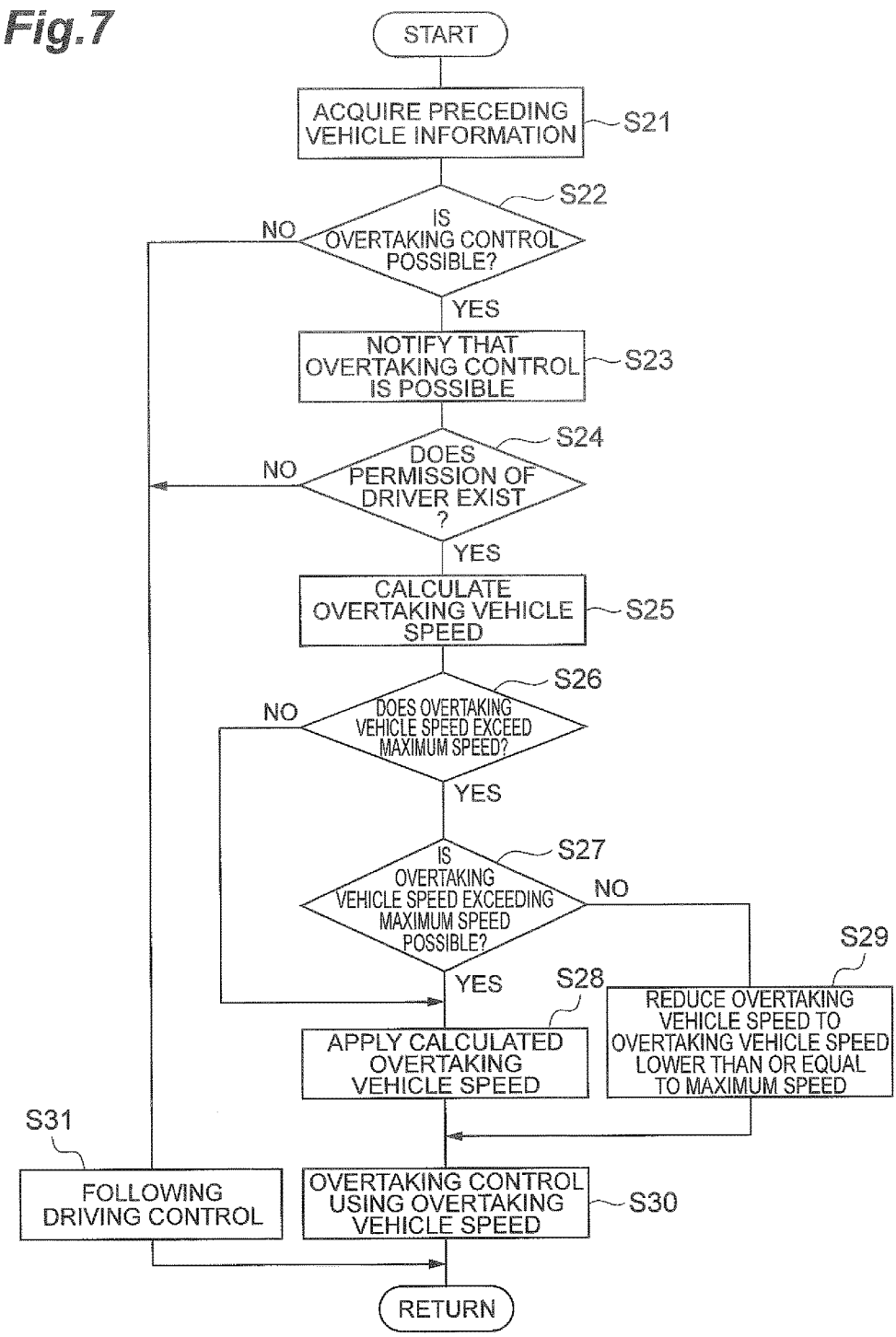
FIG. 7 is a flowchart showing an operation of the driving control device of FIG. 6.

As shown in FIG. 7, the determination unit 13a of the driving control device 100b performs processing of S21 and S22 in the same manner as S11 and S12 of FIG. 2 of the first embodiment described above. In a case where the determination unit 13a determines that the overtaking control is possible (S22), the notification unit 16 of the ECU 10 notifies the driver of the host vehicle V that the overtaking control is possible (S23). In a case where the permission acceptance unit 17 of the ECU 10 does not accept the permission of the overtaking control from the driver of the host vehicle V (S24), the driving control unit 15 performs the following driving control such that the host vehicle V does not overtake the preceding vehicle VF1 or the like but performs the following traveling while maintaining the inter-vehicle distance set for the preceding vehicle VF1 or the like in advance (S31). On the other hand, in a case where the permission acceptance unit 17 accepts the permission of the overtaking control from the driver of the host vehicle V (S24), the driving control device 100b performs processing of S25 to S30 in the same manner as S13 to S18 of FIG. 2 of the first embodiment described above.

According to this embodiment, in a case where a determination that the overtaking control is possible having been made by the determination unit 13a is notified to the driver by the notification unit 16 and the permission acceptance unit 17 does not accept the permission of the overtaking control from the driver, the driving of the host vehicle V is controlled by the driving control unit 15 such that the preceding vehicle VF1 or the like is not overtaken. For this reason, for example, the overtaking control using the overtaking vehicle speed $V_{tgt}$ exceeding the legal maximum speed can be prevented from being performed even though this is not intended by the driver.

Further, in this embodiment, a configuration may be made in which in a case where after the same processing as that of S11 to S15 of FIG. 2 of the first embodiment described above is performed, a determination that the overtaking control using the overtaking vehicle speed $V_{tgt}$ exceeding the legal maximum speed on the road on which the host vehicle V is traveling is possible is made by the determination unit 13a, the notification unit 16 notifies the driver of the host vehicle V that the overtaking control using the overtaking vehicle speed $V_{tgt}$ exceeding the legal maximum speed is possible, and the permission acceptance unit 17 accepts the permission of the overtaking control using the overtaking vehicle speed $V_{tgt}$ exceeding the legal maximum speed from the driver of the host vehicle V. In this case, in a case where the permission acceptance unit 17 does not accept the permission of the overtaking control using the overtaking vehicle speed $V_{tgt}$ exceeding the legal maximum speed from the driver of the host vehicle V, the driving control unit 15 may perform the overtaking control using the overtaking vehicle speed $V_{tgt}$ lower than or equal to the legal maximum speed.

Further, in this embodiment, after the same processing as that of S11 to S17 of FIG. 2 of the first embodiment described above is performed, the notification unit 16 may notify the driver of the host vehicle V of the overtaking vehicle speed $V_{tgt}$ calculated by the overtaking vehicle speed calculation unit 14, along with that the overtaking control is possible. Alternatively, a configuration may be made in which when the permission acceptance unit 17 accepts the permission of the overtaking control from the driver of the host vehicle V, the permission acceptance unit 17 accepts a range of the overtaking vehicle speed $V_{tgt}$ which the driver of the host vehicle V permits, and the driving control unit 15 performs the overtaking control within the range of the overtaking vehicle speed $V_{tgt}$ which the driver of the host vehicle V permits.

Third Embodiment

Figure 8:
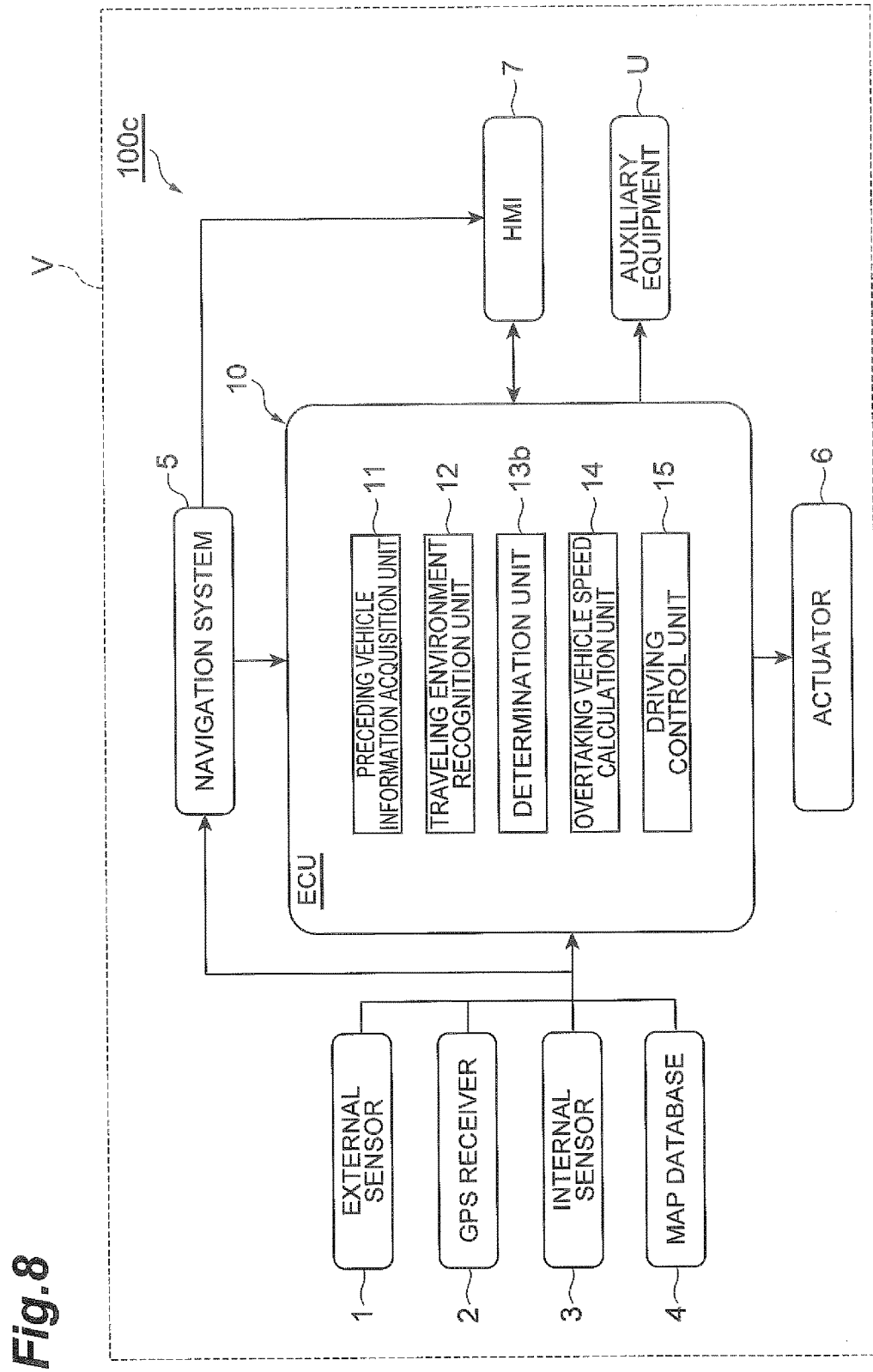
FIG. 8 is a block diagram showing the configuration of a driving control device according to a third embodiment.

Hereinafter, a third embodiment will be described. In this embodiment, in a case where a space in which the host vehicle V ca travel exists in front of the preceding vehicle VF1 or the like, it is determined that the overtaking control is possible. As shown in FIG. 8, a driving control device 100c according to the third embodiment has a determination unit 13b having an added function with respect to the determination unit 13a of the driving control device 100a of the first embodiment. The determination unit 13b determines that the overtaking control is possible, in a case where a space in which the host vehicle V can travel exists in front of the preceding vehicle VF1 or the like.

The determination unit 13b can detect the space in which the host vehicle V can travel, in front of the preceding vehicle. VF1 or the like, by the camera, the radar, or the LIDAR of the external sensor 1. Further, the driving control device 100c is further provided with a communication instrument, and the determination unit 13b may acquire information about the space in which the host vehicle V can travel, in front of the preceding vehicle VF1 or the like, by vehicle-to-vehicle communication with the preceding vehicle VF1 or the like, or road-to-vehicle communication with a road-side facility provided with a sensor which can detect the preceding vehicle VF1 or the like. Further, the determination unit 13b may acquire information about the space in which the host vehicle V can travel, in front of the preceding vehicle VF1 or the like, through the HMI 7 from the driver of the host vehicle V, who has recognized the space in which the host vehicle V can travel, in front of the preceding vehicle VF1 or the like.

Figure 9:
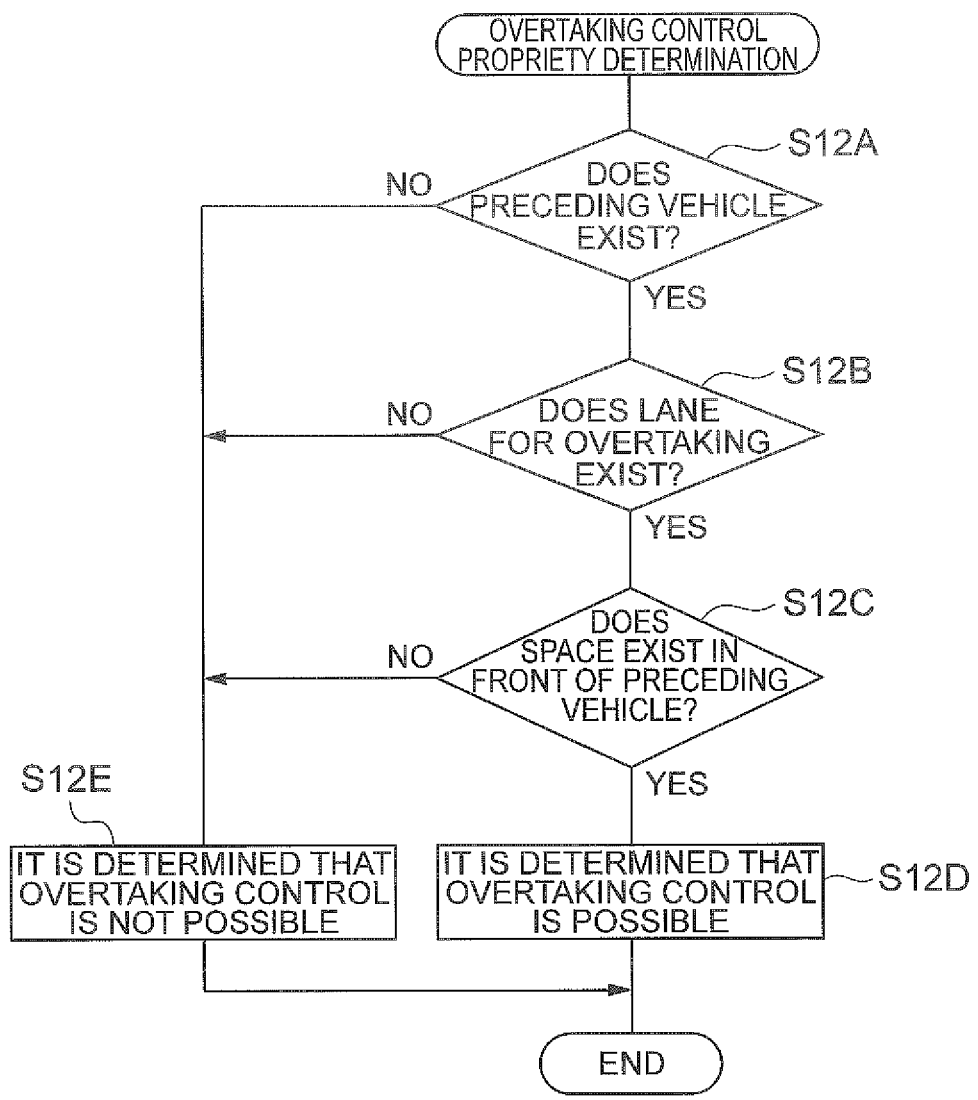
FIG. 9 is a flowchart showing an operation of an overtaking control propriety determination of the driving control device of FIG. 8.

The driving control device 100c of this embodiment performs the same processing as that of S11 to S19 of FIG. 2 of the first embodiment as a whole. In an overtaking control propriety determination which determines the propriety of the overtaking control of S12 of FIG. 2, the determination unit 13b of the driving control device 100c performs processing shown in FIG. 9. As shown in FIG. 9, in a case where the preceding vehicle VF1 or the like exists (S12A), the lane 201 or the like for overtaking, in which another vehicle impeding overtaking does not exist, exists (S12B), and the space in which the host vehicle V can travel exists in front of the preceding vehicle VF1 or the like (S12C), the determination unit 13b determines that the overtaking control is possible (S12D). On the other hand, in a case where any of the conditions of S12A to S12C are not satisfied, the determination unit 13b determines that the overtaking control is not possible (S12E).

Figure 10A:
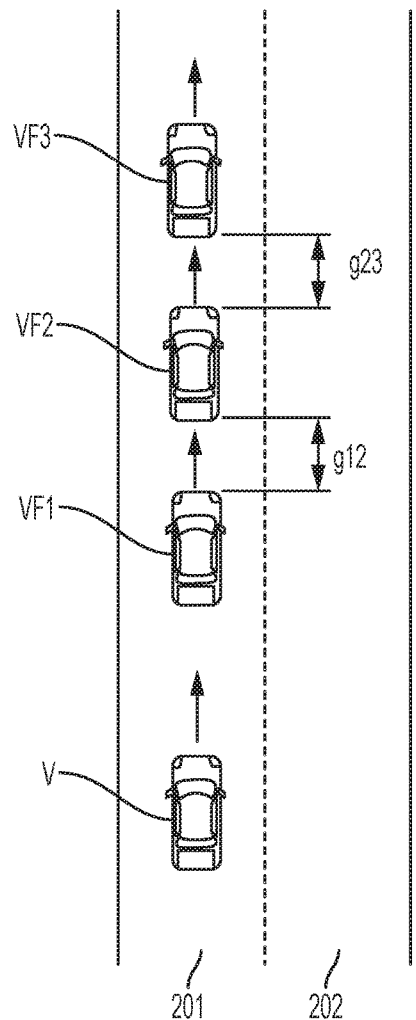
FIG. 10A is a plan view showing a situation where a space in which a host vehicle can travel does not exist in front of a preceding vehicle.
Figure 10B:
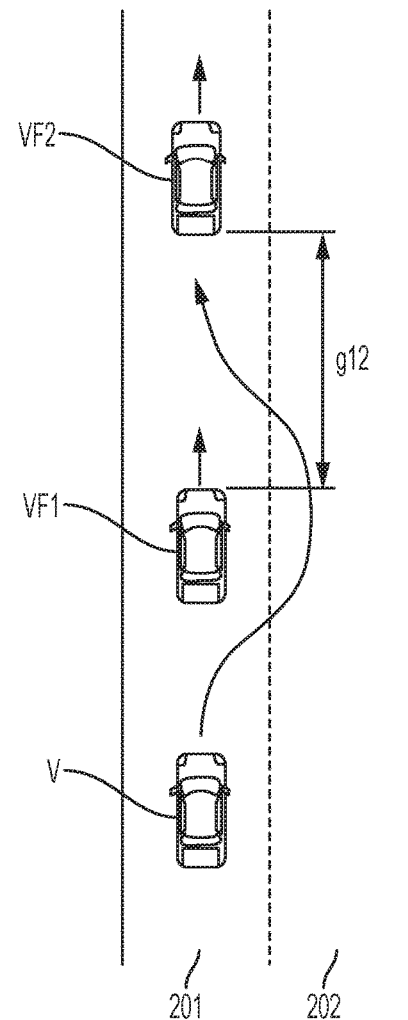
FIG. 10B is a plan view showing a situation where a space in which a host vehicle can travel exists in front of a preceding vehicle.

As shown in FIG. 10A, for example, in a case where both of an inter-vehicle distance g12 between the preceding vehicle VF1 and the preceding vehicle VF2 and an inter-vehicle distance g23 between the preceding vehicle VF2 and the preceding vehicle VF3 are less than or equal to the overall length of the host vehicle V and the presence or absence of a space in front of the preceding vehicle VF3 cannot be detected by the external sensor 1 or the like, the determination unit 13b determines that the overtaking control is not possible. On the other hand, as shown in FIG. 10B, for example, in a case where the inter-vehicle distance g12 between the preceding vehicle VF1 and the preceding vehicle VF2 is greater than or equal to a predetermined inter-vehicle distance threshold value greater than or equal to the overall length of the host vehicle V, the determination unit 13b determines that the overtaking control is possible. An inter-vehicle distance threshold value is a threshold value of an inter-vehicle distance for determining whether or not the overtaking control is possible, according to the length of the inter-vehicle distance.

The inter-vehicle distance threshold value may be set, for example, so as to become longer as the speed of the preceding vehicle VF1 or the like becomes higher. Further, a determination of whether or not the space in which the host vehicle V can travel exists in front of the preceding vehicle VF1 or the like may be determined with an inter-vehicle time between the preceding vehicles VF1, VF2, and the like as a reference, in addition to an aspect in which it is determined with the inter-vehicle distance between the preceding vehicles VF1, VF2, and the like as a reference.

In this embodiment, in a case where the space in which the host vehicle V can travel exists in front of the preceding vehicle VF1 or the like, a determination that the overtaking control is possible is made by the determination unit 13b, and therefore, a time in which the host vehicle V travels in excess of the legal maximum speed can be prevented from becoming longer due to, for example, the overtaking control using the overtaking vehicle speed $V_{tgt}$ exceeding the legal maximum speed being started, though the space in which the host vehicle V can travel does not exist in front of the preceding vehicle VF1 or the like.

Fourth Embodiment

Hereinafter, a fourth embodiment will be described. In this embodiment, in a case where an estimated overtaking time from the start of the overtaking control to the completion of the overtaking control is less than or equal to an overtaking time threshold value, it is determined that the overtaking control is possible. The overtaking time threshold value is a threshold value of an overtaking time for determining whether or not the overtaking control is possible, according to the length of an overtaking time. As shown in FIG. 11, a driving control device 100d according to the fourth embodiment has a determination unit 13c having an added function with respect to the determination unit 13a of the driving control device 100a of the first embodiment. The determination unit 13c determines that the overtaking control is possible, in a case where the estimated overtaking time from the start of the overtaking control to the completion of the overtaking control is less than or equal to the overtaking time threshold value.

Figure 12:
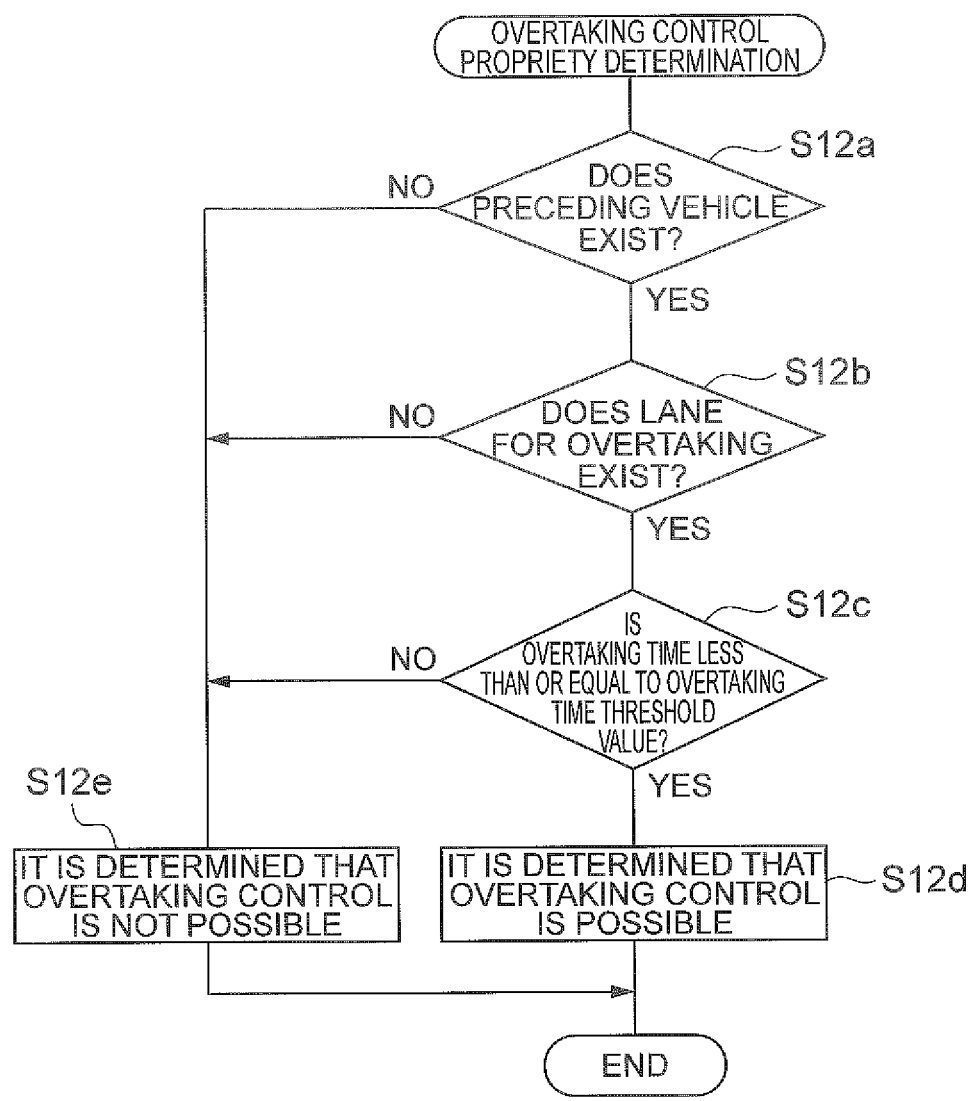
FIG. 12 is a flowchart showing an operation of an overtaking control propriety determination of the driving control device of FIG. 11.

The driving control device 100d of this embodiment performs the same processing as that of S11 to S19 of FIG. 2 of the first embodiment as a whole. In the overtaking control propriety determination which determines the propriety of the overtaking control of S12 of FIG. 2, the determination unit 13c of the driving control device 100d performs processing shown in FIG. 12. As shown in FIG. 12, in a case where the preceding vehicle VF1 or the like exists (S12a), the lane 201 or the like for overtaking, in which another vehicle impeding overtaking does not exist, exists (S12b), and an overtaking time is less than or equal to the overtaking time threshold value (S12c), the determination unit 13c determines that the overtaking control is possible (S12d). On the other hand, in a case where any of the conditions of S12a to S12c are not satisfied, the determination unit 13c determines that the overtaking control is not possible (S12e).

Figure 13A:
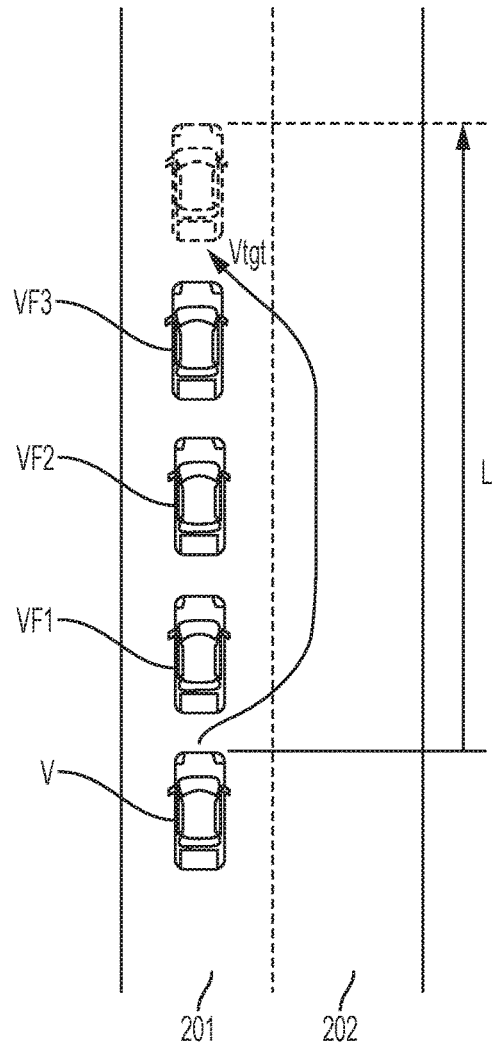
FIG. 13A is a plan view showing a situation where the distance from the position of a host vehicle at the time of the start of overtaking control to the position of the host vehicle at the time of the completion of overtaking control is long.
Figure 13B:
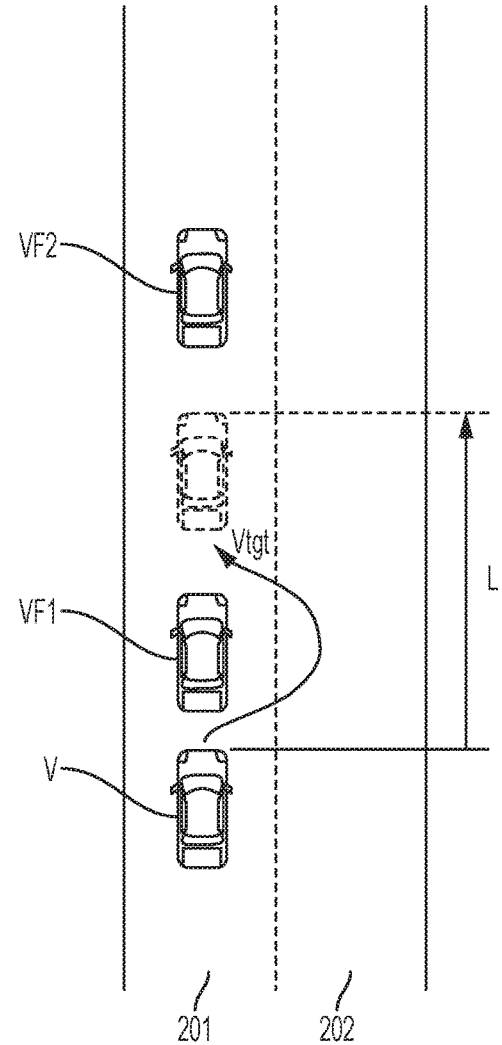
FIG. 13B is a plan view showing a situation where the distance from the position of the host vehicle at the time of the start of overtaking control to the position of the host vehicle at the time of the completion of overtaking control is short.

In the processing of S12c, the determination unit 13c detects the space in which the host vehicle V can travel, in front of the preceding vehicle VF1 or the like, in the same manner as in the third embodiment described above. As shown in FIG. 13A, in a case where a distance L from the host vehicle V to the space in which the host vehicle V can travel, in front of the preceding vehicle VF3, is long and an overtaking time T shown in the relationship of distance L/overtaking vehicle speed $V_{tgt}$=overtaking time T exceeds an overtaking time threshold value $T_{th}$ set in advance, the determination unit 13c determines that the overtaking control is not possible. On the other hand, as shown in FIG. 13B, in a case where the distance L from the host vehicle V to the space in which the host vehicle V can travel, in front of the preceding vehicle VF1, is short and the overtaking time T is less than or equal to the overtaking time threshold value $T_{th}$, the determination unit 13c determines that the overtaking control is possible.

Further, a determination of whether or not the estimated overtaking time T from the start of the overtaking control to the completion of the overtaking control is less than or equal to the overtaking time threshold value $T_{th}$ may be determined by whether or not the distance L from the host vehicle V to the space in which the host vehicle V can travel, in front of the preceding vehicle VF1, is less than or equal to a threshold value of a distance set in advance.

According to this embodiment, in a case where the estimated overtaking time T from the start of the overtaking control to the completion of the overtaking control is less than or equal to the overtaking time threshold value $T_{th}$, a determination that the overtaking control is possible is made by the determination unit 13c, and therefore, a time in which the host vehicle V travels in excess of the legal maximum speed can be prevented from becoming longer due to, for example, the overtaking control using the overtaking vehicle speed $V_{tgt}$ exceeding the legal maximum speed being started, though the overtaking time T is long.

Embodiments of the present invention have been described above. However, the present invention can be implemented in various forms without being limited to the above-described embodiments. For example, the first to fourth embodiments can be implemented by combining some of all thereof with each other.

What is claimed is:

1. A driving control device that performs overtaking control for overtaking a preceding vehicle in front of a host vehicle, comprising:
   a preceding vehicle information acquisition unit configured to acquire preceding vehicle information about a speed of the preceding vehicle;
   a traveling environment recognition unit configured to recognize a traveling environment of the host vehicle;
   a determination unit configured to determine propriety of the overtaking control, based on the traveling environment;
   an overtaking vehicle speed calculation unit configured to calculate an overtaking vehicle speed of the host vehicle, based on the preceding vehicle information, in response to a determination by the determination unit that the overtaking control is possible; and
   a driving control unit configured to execute the overtaking control using the overtaking vehicle speed in response to the vehicle overtaking speed being greater than a predetermined speed and a determination that the host vehicle is allowed to travel at the vehicle overtaking speed greater than the predetermined speed.

2. The driving control device according to claim 1, wherein
   the determination unit is configured to recognize a legal maximum speed on a road on which the host vehicle is traveling, based on the traveling environment, and determine propriety of the overtaking control using the overtaking vehicle speed exceeding the legal maximum speed, in a case where the overtaking vehicle speed in which a speed difference relative to the speed of the preceding vehicle becomes the predetermined speed difference exceeds legal maximum speed, and
   the overtaking vehicle speed calculation unit is configured to calculate the overtaking vehicle speed exceeding the legal maximum speed, in response to a determination by the determination unit that the overtaking control using the overtaking vehicle speed exceeding the legal maximum speed is possible.

3. The driving control device according to claim 2, wherein the determination unit is configured to determine that the overtaking control using the overtaking vehicle speed exceeding the legal maximum speed is possible, in either of a case where another vehicle which travels on the same lane as a lane on which the host vehicle travels is approaching at a speed higher than or equal to the legal maximum speed from the rear of the host vehicle and a case where another vehicle which travels on a lane which joins the lane on which the host vehicle travels is approaching the host vehicle from the side or the rear of the host vehicle.

4. The driving control device according to claim 3, wherein the determination unit is configured to determine that the overtaking control is possible, in a case where a space in which the host vehicle can travel exists in front of the preceding vehicle.

5. The driving control device according to claim 3, wherein the determination unit is configured to determine that the overtaking control is possible, in a case where an estimated overtaking time from start of the overtaking control to completion of the overtaking control is less than or equal to an overtaking time threshold value.

6. The driving control device according to claim 3, further comprising:
a notification unit configured to notify a driver of the host vehicle that the overtaking control is possible, in response to a determination by the determination unit that the overtaking control is possible; and
a permission acceptance unit configured to accept permission of the overtaking control from an input by the driver of the host vehicle in response to a notification by the notification unit that the overtaking control is possible,
wherein the driving control unit is configured to control driving of the host vehicle such that the preceding vehicle is not overtaken, in a case where the permission acceptance unit does not accept permission of the overtaking control from the driver of the host vehicle when the permission acceptance is not input by the driver.

7. The driving control device according to claim 2, wherein the determination unit is configured to determine that the overtaking control is possible, in a case where a space in which the host vehicle can travel exists in front of the preceding vehicle.

8. The driving control device according to claim 2, wherein the determination unit is configured to determine that the overtaking control is possible, in a case where an estimated overtaking time from start of the overtaking control to completion of the overtaking control is less than or equal to an overtaking time threshold value.

9. The driving control device according to claim 2, further comprising:
a notification unit configured to notify a driver of the host vehicle that the overtaking control is possible, in response to a determination by the determination unit that the overtaking control is possible; and
a permission acceptance unit configured to accept permission of the overtaking control from an input by the driver of the host vehicle in response to a notification by the notification unit that the overtaking control is possible,
wherein the driving control unit is configured to control driving of the host vehicle such that the preceding vehicle is not overtaken, in a case where the permission acceptance unit does not accept permission of the overtaking control from the driver of the host vehicle when the permission acceptance is not input by the driver.

10. The driving control device according to claim 1, wherein the determination unit is configured to determine that the overtaking control is possible, in a case where a space in which the host vehicle can travel exists in front of the preceding vehicle.

11. The driving control device according to claim 1, wherein the determination unit is configured to determine that the overtaking control is possible, in a case where an estimated overtaking time from start of the overtaking control to completion of the overtaking control is less than or equal to an overtaking time threshold value.

12. The driving control device according to claim 1, further comprising:
a notification unit configured to notify a driver of the host vehicle that the overtaking control is possible, in response to a determination by the determination unit that the overtaking control is possible; and
a permission acceptance unit configured to accept permission of the overtaking control from an input by the driver of the host vehicle in response to a notification by the notification unit that the overtaking control is possible,
wherein the driving control unit is configured to control driving of the host vehicle such that the preceding vehicle is not overtaken, in a case where the permission acceptance unit does not accept permission of the overtaking control from the driver of the host vehicle when the permission acceptance is not input by the driver.

13. A driving control device that performs overtaking control for overtaking a preceding vehicle in front of a host vehicle, comprising:
a preceding vehicle information acquisition unit configured to acquire preceding vehicle information about a speed of the preceding vehicle;
a traveling environment recognition unit configured to recognize a traveling environment of the host vehicle;
a determination unit configured to determine propriety of the overtaking control, based on the traveling environment;
an overtaking vehicle speed calculation unit configured to calculate an overtaking vehicle speed of the host vehicle, based on the preceding vehicle information, in response to a determination by the determination unit that the overtaking control is possible;
a driving control unit configured to execute the overtaking control using the overtaking vehicle speed,
a notification unit configured to notify a driver of the host vehicle that the overtaking control is possible, in response to a determination by the determination unit that the overtaking control is possible; and
a permission acceptance unit configured to accept permission of the overtaking control from an input by the driver of the host vehicle in response to a notification by the notification unit that the overtaking control is possible,
wherein the overtaking vehicle speed calculation unit is configured to calculate the overtaking vehicle speed which is faster than the speed of the preceding vehicle and in which a speed difference relative to the speed of the preceding vehicle becomes a predetermined speed difference, and
wherein the driving control unit is configured to control driving of the host vehicle such that the preceding vehicle is not overtaken, in a case where the permission acceptance unit does not accept permission of the overtaking control from the driver of the host vehicle when the permission acceptance is not input by the driver.

* * * * *